United States Patent
Fithian et al.

(10) Patent No.: US 8,005,776 B2
(45) Date of Patent: Aug. 23, 2011

(54) ADAPTING MEDIA STORAGE BASED ON USER INTEREST AS DETERMINED BY BIOMETRIC FEEDBACK

(75) Inventors: Rachel H. Fithian, Raleigh, NC (US); Hugh E. Hockett, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 700 days.

(21) Appl. No.: 12/019,788

(22) Filed: Jan. 25, 2008

(65) Prior Publication Data
US 2009/0192961 A1    Jul. 30, 2009

(51) Int. Cl.
*G06F 17/00* (2006.01)
*G06N 5/02* (2006.01)

(52) U.S. Cl. ............... 706/46; 455/411; 382/115

(58) Field of Classification Search ............ 706/46; 455/411; 382/115
See application file for complete search history.

(56) References Cited

U.S. PATENT DOCUMENTS

| | | |
|---|---|---|
| 4,312,358 A | 1/1982 | Barney |
| 5,157,604 A | 10/1992 | Axford et al. |
| 2008/0317292 A1* | 12/2008 | Baker et al. ............ 382/115 |
| 2009/0079547 A1* | 3/2009 | Oksanen et al. ......... 340/10.3 |
| 2009/0121894 A1* | 5/2009 | Wilson et al. ......... 340/825.52 |

* cited by examiner

*Primary Examiner* — Omar F Fernandez Rivas
*Assistant Examiner* — Kalpana Bharadwaj
(74) *Attorney, Agent, or Firm* — Patents on Demand, P.A.; Brian K. Buchheit; Scott M. Garrett

(57) ABSTRACT

The present invention discloses a system, method, apparatus, and computer usable product code adapting a media stream based upon biometric feedback. The system can include one or more biometric sensor, a media handling component, an importance inference engine, and a media processing component. The biometric sensor can be able to receive biometric feedback from at least one user. The media handling component can be a media creation component (e.g., video recorder, camera, etc.) and/or a media playback component (e.g., video player, music player, etc.). The importance inference engine can be configured to analyze biometric feedback received from the biometric sensor to determine an emotional interest level that a provider of the biometric feedback has in the media of the media handling component. The media processing component can modify the media of the media handling component based upon the emotion interest level determined by the importance inference engine.

17 Claims, 3 Drawing Sheets

ADAPTING MEDIA STORAGE BASED ON USER INTEREST AS DETERMINED BY BIOMETRIC FEEDBACK

BACKGROUND OF THE INVENTION

The present invention relates to the field of digital media storage and navigation and, more particularly, to adapting the bitrate of media based on user interest as determined by biometric feedback.

Currently, media storage and navigation is performed based on conventions such as multimedia device configuration settings and/or traditional organizational schemes such as hierarchical directory structures. These current methods for handling media often do not reflect a user's interest and needs. Presently, media is treated with the same level of importance and the user must manually determine which media or portions of media are relevant and important. Multimedia devices such as camcorders, MP3 players, and digital video recorders attempt to compensate for this shortcoming by offering a few means to store and navigate media based on user's interest. These mechanisms such as playlists and bookmarks, however, must be manually organized and are tedious for users to maintain. Further, as user's preferences/tastes change these mechanisms, which are static, quickly become outdated, limited, and confining.

Media navigation also suffers from the similar problem of being arbitrarily determined and not aligned with user's specific interest. For example, movie digital video disc (DVD) menus offer users the ability to select scenes which are statically created by the movie creators. Many times these predetermined scenes do not reflect the user's favorite scenes. As such, users must manually navigate to favorite sections of a movie when their favorite sections do not correspond to the movie creator's selected scenes. This manual navigation can be time consuming and potentially fruitless when users forget the location of a favored section. What is needed is a means for storing and navigating media which is directed at user's interest.

BRIEF SUMMARY OF THE INVENTION

One aspect of the present invention can include a system for adapting a media stream based upon biometric feedback. The system can include one or more biometric sensors, a media handling component, an importance inference engine, and a media processing component. The biometric sensor can be able to receive biometric feedback from at least one user. The media handling component can be a media creation component (e.g., video recorder, camera, etc.) and/or a media playback component (e.g., video player, music player, etc.). The importance inference engine can be configured to analyze biometric feedback received from the biometric sensor to determine an emotional interest level that a provider of the biometric feedback has in the media of the media handling component. The media processing component can modify the media of the media handling component based upon the emotion interest level determined by of the importance inference engine.

Another aspect of the present invention can include a method for handling media that includes executing a media operation. The media operation can capture input to create media and/or can present previously created media to a set of viewers. The media can be segmented into a set of portions. Biometric feedback can be captured as the media operation executes. The biometric feedback can be used to determine an emotional interest level of a provider of the biometric feedback. Different ones of the portions of the media can be associated with different determined emotional interest levels. The media can be stored in a variable manner based upon the determined emotion interest levels.

DETAILED DESCRIPTION OF THE INVENTION

Figure 1:
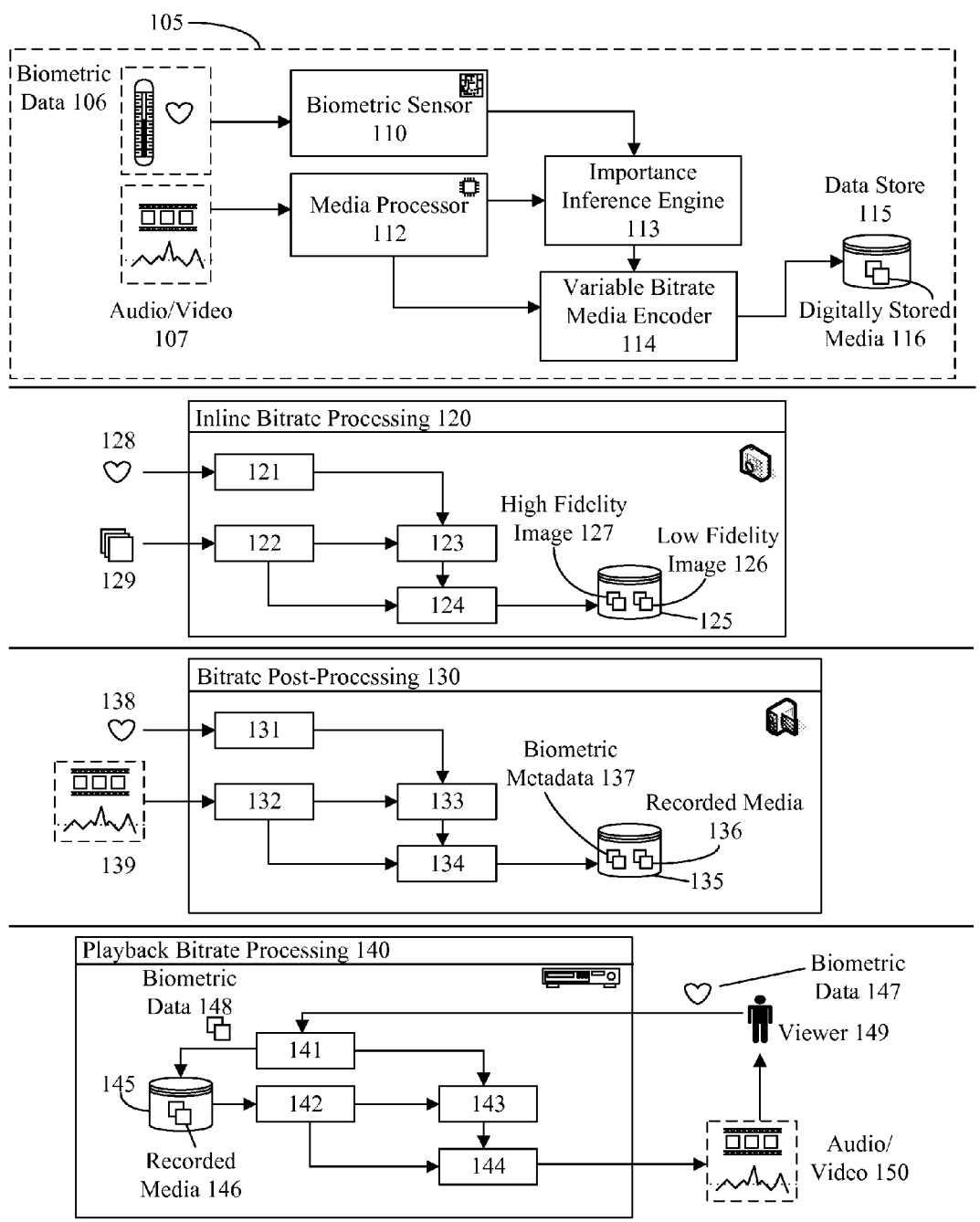
FIG. 1 is a schematic diagram illustrating a system and contemplated embodiments for adapting the bitrate of a media stream based on user interest in accordance with an embodiment of the inventive arrangements disclosed herein.

The present invention discloses a solution for adapting the bitrate of media based on user interest as determined by biometric feedback. In the solution, biometric data such as heart rate, respiratory rate, body temperature and the like can be utilized to aid media storage and navigation. Biometric data can be collected during a recording or playback phase and can be used to relate user interest with one or more portions of a media stream. During recording, biometric data can be used to detect user interest and trigger a change in bitrate of the media stream. When user interest is determined to be high, bitrate of the media stream can be increased. Conversely, when user interest is determined to be low, fidelity of the media stream can be decreased. Modification of bitrate can occur during a storage phase and/or can occur during a playback phase indicated by portions of the media stream tagged with biometric metadata.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. Examples of a computer-readable medium include a semiconductor or solid state memory, magnetic tape, a removable computer diskette, a random access memory (RAM), a read-only memory (ROM), an erasable programmable read-only memory (EPROM or Flash memory, a rigid magnetic disk and an optical disk. Current examples of optical disks include compact disk-read only memory (CD-ROM), compact disk-read/write (CD-R/W) and DVD. Other computer-readable medium can include a transmission media, such as those supporting the Internet, an intranet, a personal area network (PAN), or a magnetic storage device. Transmission media can include an electrical connection having one or more wires, an optical fiber, an optical storage device, and a defined segment of the electromagnet spectrum through which digitally encoded content is wirelessly conveyed using a carrier wave.

Note that the computer-usable or computer-readable medium can even include paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1 is a schematic diagram illustrating a system 105 and contemplated embodiments 120-140 for adapting the bitrate of a media stream based on user interest in accordance with an embodiment of the inventive arrangements disclosed herein. In FIG. 1, collected biometric data 106, 128, 138 and 147 can be used to change the bitrate of digitally stored media 116, 126-127, 136, and 146. Biometric data 106, 128, 138 and 147 can be used to determine a user's emotional interest and optionally adjust the bitrate of media 116, 126-127, 136, and 146 and/or present navigation options to one or more selected portions of the stored media. Embodiments 120-140 illustrate various behaviors for altering bitrate of media processing and providing navigation choices in accordance with system 105. Media and/or media streams can include audio, video, images, and the like. Bitrate modification can include adjusting and/or changing compression options, resolution, encoding schemes, scaling, sampling frequency, usage of checksums, and the like.

As used herein, biometric data 106, 128, 138 and 147 can include, but is not limited to, heart rate, respiratory rate, galvanic skin response (GSR), pupil dilation, blood pressure, body temperature, and the like. Biometrics can be collected from sensors which can include, but is not limited to, electrodermal sensors, microphones, thermometers, accelerometers, and the like. Biometric data 106, 128, 138 and 147 can be time-synched to a media stream, tagging one or more portions of the media with biometric metadata. Biometric metadata can be used by an importance inference engine 113 to determine user interest for tagged portions of the media stream. Based on user interest, the bitrate of stored media 116 can be adjusted accordingly during storage and/or presentation. Biometric data 106, 128, 138 and 147 can be used to determine at least one or more different levels of user interest and as a result be utilized to trigger a change in media processing. For example, when user interest is determined to be high, the bitrate of media can be increased, and conversely, when user interest is low, the bitrate of media can be decreased.

In system 105, biometric data 106 can be collected via biometric sensor 110 which can include wired and/or wireless biometric sensors capable of monitoring one or more biological sources. Collection can occur simultaneously and can be synchronized with audio/video 107 processing performed by media processor 112. Biometric data 106 can be analyzed by importance inference engine 113 to determine significance of corresponding sections of audio/video 107. For a given time period of a media stream 107, biometric data 106 can be interpreted to determine a user interest in a portion of the stream 107. Based on sample and/or historic biometric data, engine 113 can determine user interest in a portion of media 107. For instance, elevated heart and/or respiratory rate can indicate an increase in user interest. Changes in user interest can trigger variable bitrate media encoder 114 to adjust the bitrate processing of audio/video 107 based on configuration options (not shown). Changes made by encoder 114 can be temporarily or permanently stored in data store 115 as media 116.

In embodiment 120, elements 121-125 can correspond to components 110-114 present in system 105. Inline bitrate processing 120 can be a non-reversible processing for media 129 stored in data store 125. Biometric data 128 can be collected during capture of media 129. Media 129 that correlate to a high user interest can be stored as high fidelity image 127. When user interest is determined to be low, media can be stored as low a fidelity image 126 or at a normal fidelity. For example, a digital camera can obtain biometric data 128 during picture 129 capture. When user interest is detected as being high, the image resolution and megapixel count can be increased storing the picture 129 as high fidelity image 127.

Collected biometric data 128 can be stored as metadata in images 126, 127 for use in playback and navigation. Presentation of media associated with high user interest can be achieved either by selecting images stored in high fidelity or by utilizing stored biometric metadata in images 126, 127. For example, a slideshow of a user's favorite pictures can be created based on pictures that contain biometric metadata indicating an elevated heart rate.

In embodiment 130, elements 131-135 can correspond to components 110-114 present in system 105. Bitrate post-processing 130 can capture biometric data 138 during recording of media stream 139. Biometric data 138 can be time-synched to media stream 139 and stored in data store 135. Biometric metadata 137 can be stored along with recorded media 136 for use in playback and navigation. For example, a camcorder can collect biometric data about a user's respiratory rate during a recording session and determine sections which are most likely of high interest to the user. These sections of high user interest can be indexed for future playback. When playback is initiated, the user can be prompted to view the entire recording or portions that were determined to be of interest to the user.

In embodiment 140, elements 141-145 can correspond to components 110-114 present in system 105. In playback bitrate processing 140, a recorded media stream 146 can be presented to a viewer 149. During playback of media 146, biometric data 147 can be collected and analyzed by importance inference engine 143. Based on a determination of user interest, the bitrate of audio/video stream 150 can be increased or decreased in real-time or near real-time. Collected biometric data 148 can be time-synchronized and stored as metadata in recorded media 146 for future playback sessions. Alternatively, the metadata 148 can be stored separately in data store 145. Using biometric metadata, variable bitrate media encoder 144 can tag specific portions of media 146 with fidelity/bitrate options and/or directives. During the next playback session, these options/directives can allow variable bitrate encoder 144 to modify the bitrate of audio/video 150 in response to pre-determined user's interest. Biometric data 147 can be repeatedly collected during each viewing allowing playback to adapt to user's changing interests. For instance, newly collected biometric data can be compared and merged with historic biometrics previously collected.

Embodiments presented herein are for illustrative purposes only, and should not be construed to limit the invention in any regard. Alternative embodiments can be contemplated including, but not limited to, configurations in which components 110-115 can be distributed over one or more computing devices, computing devices with multimedia capabilities (e.g. Internet tablet, desktop computer), and the like.

As shown herein, data stores 115, 125, 135, and 145 can be physically implemented within any type of hardware including, but not limited to, a magnetic disk, an optical disk, a semiconductor memory, a digitally encoded plastic memory, a holographic memory, or any other recording medium. Each of the data stores 115, 125, 135, and 145 can be stand-alone storage units as well as a storage unit formed from a plurality of physical devices, which may be remotely located from one another. Additionally, information can be stored within each data store 115, 125, 135, and 145 in a variety of manners. For example, information can be stored within a database structure or can be stored within one or more files of a file storage system, where each file may or may not be indexed for information searching purposes.

Figure 2:
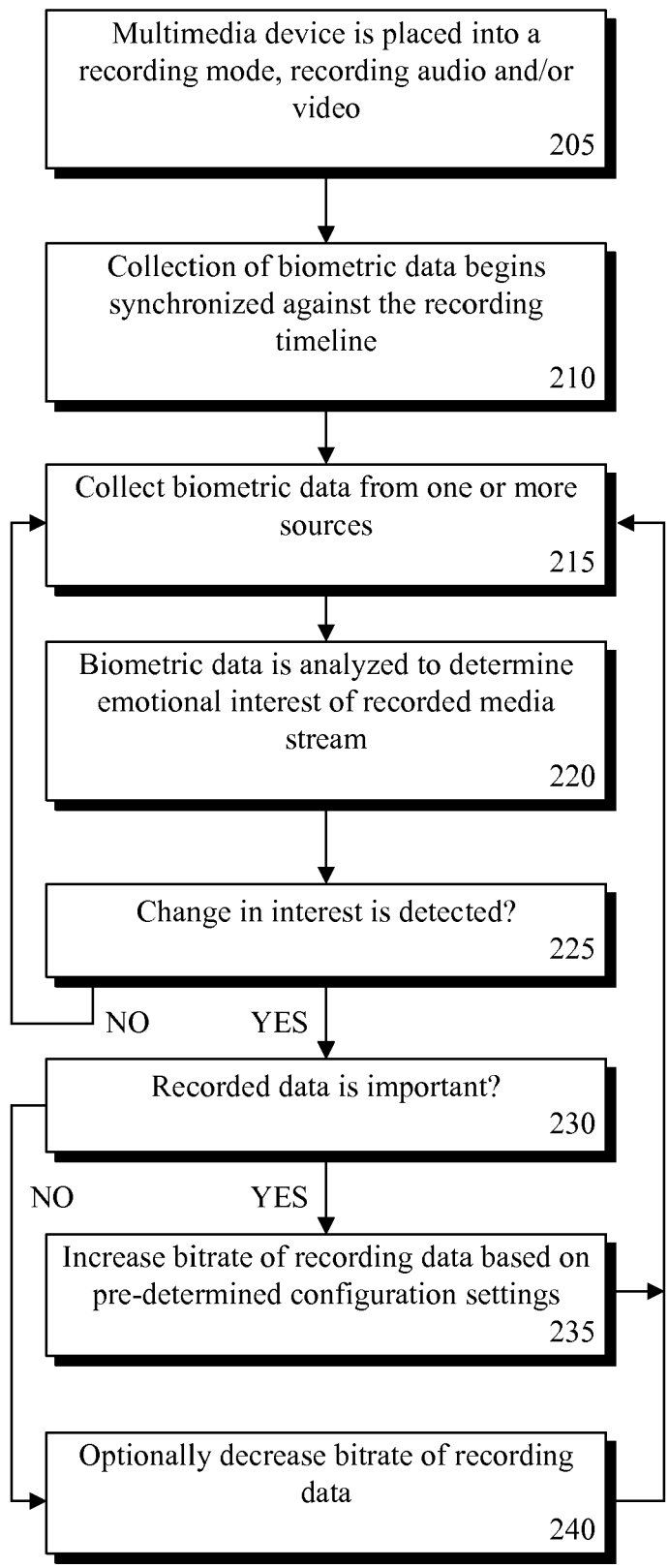
FIG. 2 is a schematic diagram illustrating a method for adjusting the bitrate of a media stream based on collected biometric metadata in accordance with an embodiment of the inventive arrangements disclosed herein.

FIG. 2 is a schematic diagram illustrating a method 200 for adjusting the bitrate of a media stream based on collected biometric metadata in accordance with an embodiment of the inventive arrangements disclosed herein. Method 200 can be performed in the context of system 105. In method 200, a multimedia device can collect biometric data time-synched against a recorded media stream. Biometric data can be used to gauge user interest and consequently adjust the bitrate of the recorded media stream.

In step 205, a multimedia device is placed into a recording mode able to record an audio/video media stream. In step 210, collection of biometric data, time-synched against the media stream timeline, begins. In step 215, biometric data is collected from one or more sources. Sources can include heart rate, respiratory rate, pupil dilation, galvanic skin response, and the like. These sources can be monitored by wired or wireless sensors capable of capturing biometric data. In step 220, biometric data is analyzed to determine emotional interest of recorded media stream. In step 225, if a change in interest has been detected the method can proceed to step 230, else return to step 215.

In step 230, if the recorded media stream is determined to be important based on the biometric feedback, the method can continue to step 235, else proceed to step 240. In step 235, the bitrate of the media stream can be increased by a threshold value determined by configuration settings of the device. In step 240, if the media stream is determined to be unimportant, the bitrate of the stored media stream can optionally be decreased.

Figure 3:
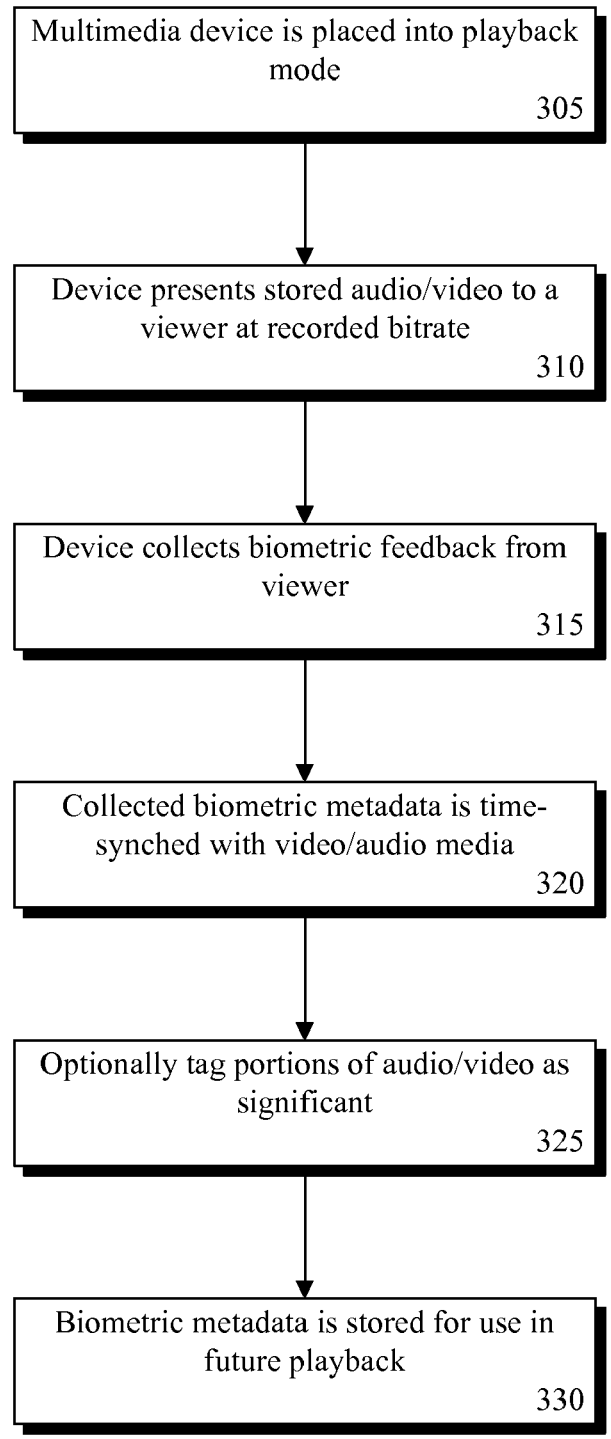
FIG. 3 is a schematic diagram illustrating a method for tagging a media stream during media playback using biometric metadata time-synched to the media stream in accordance with an embodiment of the inventive arrangements disclosed herein.

FIG. 3 is a schematic diagram illustrating a method 300 for tagging a media stream during media playback using biometric metadata time-synched to the media stream in accordance with an embodiment of the inventive arrangements disclosed herein. Method 300 can be performed in the context of system 105. In method 300, a multimedia device can collect and store biometric metadata during playback of a media stream. Collected biometric data can be used to tag a portion or portions of a media stream which can be used to determine user interest of the tagged portion.

In step 305, a multimedia device is placed into playback mode, presenting a media stream. In step 310, the device presents an audio/video media stream to a viewer at the bitrate which the media is stored. This bitrate can be the device's default bitrate, a user configured setting, and the like. In step 315, during playback, the device collects biometric feedback from the viewer. In step 320, the collected biometric metadata is time-synched with the audio/video media stream. In step 325, portions of the audio/video can be tagged as significant or insignificant as determined by an interest inference engine analysis of biometric metadata. In step 330, the biometric metadata is stored for use in future playback. Usage can include aiding user navigation, bitrate adjustment during playback, and the like.

The flowchart and block diagrams in FIGS. 2 and 3 illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A system for adapting a media stream based upon biometric feedback comprising:

at least one biometric sensor able to receive biometric feedback from at least one user;

a media handling component configured to perform at least one media operation involving media for the at least one user, wherein said media operation comprises at least one of capturing input to create media and presenting output of media;

an importance inference engine able to analyze biometric feedback received from the biometric sensor to determine an emotional interest level that a provider of the biometric feedback has in the media of the media handling component; and a media processing component configured to modify said media of the media handling component based upon the emotional interest level determined by the importance inference engine, wherein the media processing component is configured to adjusts a bitrate of said media based upon the emotional interest level.

2. The system of claim 1, wherein the media processing component adjusts the media to have a greater than baseline bitrate when the emotional interest level is greater than a baseline interest level.

3. The system of claim 1, said system further comprising:

a medium for storing said media after said media is modified by said media processing component, wherein said media stored in said medium is stored with a variable bitrate along a duration of said media.

4. The system of claim 3, wherein said media is at least one of music object and a video object, wherein said variable bitrate adjustment is made in a manner that ensures a segment of said media has a greater than baseline bitrate when the emotional interest level for that segment is greater than a baseline interest level.

5. The system of claim 1, wherein said biometric sensor, said media handling component, said importance inference engine, and said media processing component are located within a hand-held media device, wherein said at least one biometric sensor is in direct contact with a hand of the provider of the biometric feedback, and wherein said biometric feedback includes a heart rate.

6. The system of claim 1, wherein said media handling component is configured to capture input used to generate the media, wherein the biometric feedback used by the inference engine is acquired at a time the captured input is obtained and is time-synched with the captured input.

7. The system of claim 1, wherein said media handling component is configured to present said media, wherein the biometric feedback used by the importance inference engine is acquired as the media is being presented and is time-synched with a presentation of the media.

8. The system of claim 1, wherein said media comprises a plurality of sections, wherein different ones of said sections are modified by the media processing component based upon an emotional interest level of that section as determined by the importance inference engine.

9. The system of claim 7, further comprising:

at least one navigation control for jumping to an associated playback point of said media, wherein said media comprises a plurality of markers indicating an associated emotional interest level of a corresponding section, wherein said navigation control is able to move said associated playback point of said media from one of said markers to another.

10. A method for handling media comprising:

executing a media operation, wherein said media operation comprises at least one of capturing input to create media and presenting output of media, wherein the media is segmented into a plurality of portions;

capturing biometric feedback as the media operation executes;

using the biometric feedback to determine an emotional interest level of a provider of the biometric feedback, wherein different ones of the portions of the media is associated with different determined emotional interest levels; and storing said media in a variable manner based upon the determined emotion interest levels, wherein said media comprises at least one of audio and video, wherein the plurality of portions are stored in accordance with different bitrates based upon the different determined emotional interest levels.

11. The method of claim 10, wherein the biometric feedback comprises a heart rate of the provider, wherein a greater than baseline heart rate is indicative of a higher than average emotional interest level in a portion of the media corresponding to a time the biometric feedback was obtained, and wherein a lesser than baseline heart rate is indicative of a lower than average emotional interest level in a portion of the media corresponding to a time the biometric feedback was obtained.

12. The method of claim 10, wherein said media operation captures input to create media, wherein the biometric feedback is acquired at a time the captured input is obtained and is time-synched with the captured input.

13. The method of claim 10, wherein said media operation presents output of media, wherein the biometric feedback is acquired as the media is being presented and is time-synched with a presentation of the media.

14. The method of claim 10, wherein said media comprises at least one of audio, video, and a set of images.

15. A computer program product for handling media, the computer program product comprising:

a computer usable medium having computer usable program code embodied therewith, the computer usable program code comprising:

computer usable program code configured to execute a media operation, wherein said media operation comprises at least one of capturing input to create media and presenting output of media, wherein the media is segmented into a plurality of portions;

computer usable program code configured to capture biometric feedback as the media operation executes;

computer usable program code configured to use the biometric feedback to determine an emotional interest level of a provider of the biometric feedback, wherein different ones of the portions of the media is associated with different determined emotional interest levels; and computer usable program code configured to store said media in a variable manner based upon the determined emotion interest levels, wherein said media comprises at least one of audio and video, wherein the plurality of portions are stored in accordance with different bitrates based upon the different determined emotional interest levels.

16. The computer program product of claim 15, wherein said media operation captures input to create media, wherein the biometric feedback is acquired at a time the captured input is obtained and is time-synched with the captured input.

17. The computer program product of claim 15, wherein said media operation presents output of media, wherein the biometric feedback is acquired as the media is being presented and is time-synched with a presentation of the media.

* * * * *